Feb. 14, 1939.    J. J. JOHNSON    2,147,532
PHOTOGRAPHIC APPARATUS
Filed Sept. 9, 1937    2 Sheets-Sheet 1
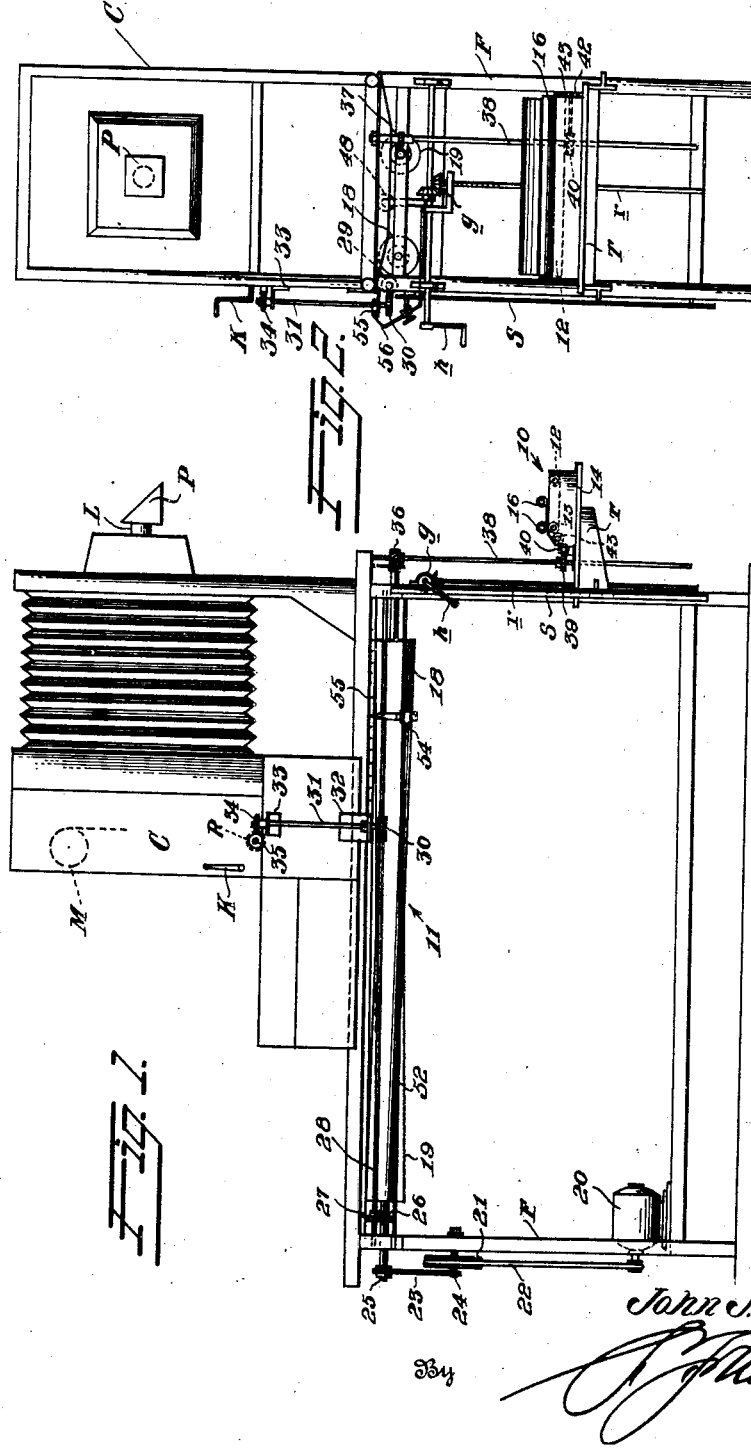
Inventor
John J. Johnson
By
Attorney Feb. 14, 1939. J. J. JOHNSON 2,147,532
PHOTOGRAPHIC APPARATUS
Filed Sept. 9, 1937 2 Sheets-Sheet 2
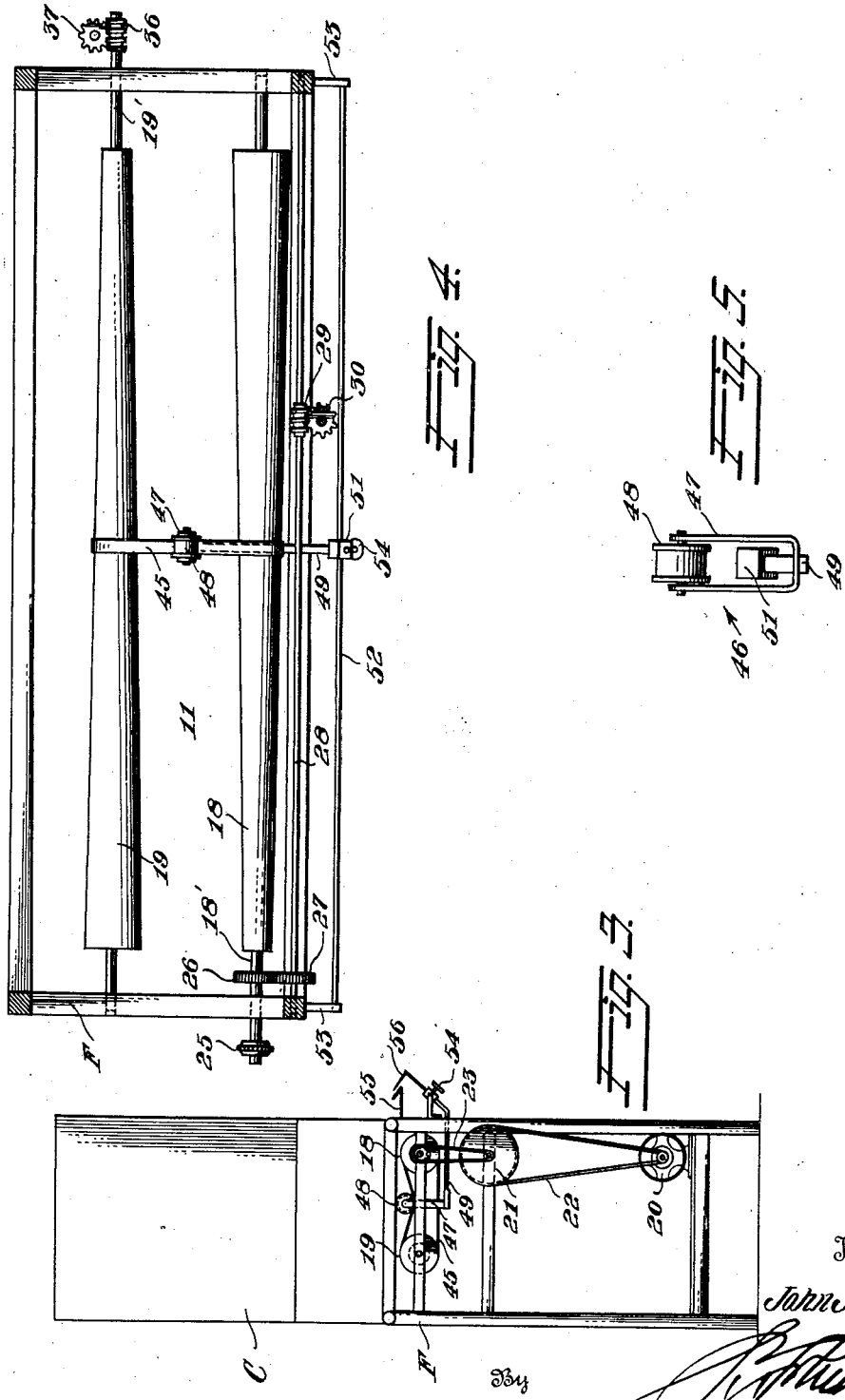

Patented Feb. 14, 1939

2,147,532

UNITED STATES PATENT OFFICE 2,147,532

PHOTOGRAPHIC APPARATUS

John J. Johnson, Dallas, Tex.

Application September 9, 1937, Serial No. 163,127

3 Claims. (Cl. 88—24)

This invention relates to photographic apparatus.

More specifically, the invention relates to an attachment for photographic cameras for a continuous reproduction of lengthy copies of records or characters such as Schlumberger electrical logs, seismograph records, driller logs, etc., the attachment embodying novel means whereby the reproduction may be enlarged, reduced, or of the same size as the original.

Apparatus now in use is capable of reproducing lengthy copies only in relatively short sections, the lengths of which are determined by the focal range of the camera, which is usually about twenty-four inches.

While by this procedure a complete reproduction of a lengthy copy may be obtained, it does not meet the maximum requirements from the standpoint of time, economy in material and quality of the completed reproduction for the reason that it is necessary to paste the short reproduced sections together which is not only time consuming, but material is wasted in overlapping of the sections, and through inadvertence the sections are sometimes placed out of order, thereby resulting in a highly objectionable reproduction.

In my co-pending application, Serial No. 150,615, filed June 26, 1937, I disclose an attachment for the purpose above set forth, the present application embodying certain improvements thereover, and being a continuation in part thereof.

A primary object of the present invention is the provision of an attachment for photographic cameras whereby lengthy copies of records or characters can be reproduced continuously, accurately, and in a single unitary strip.

A further object of the invention is the provision of an attachment for photographic cameras whereby a lengthy copy strip to be reproduced is capable of being moved continuously through the focal range of the camera at various speeds relative to the speed of the sensitized camera whereby reproductions of various sizes may be obtained.

A still further object of the invention is the provision of an attachment of the above noted character embodying positive and accurate drive means, thereby insuring a reproduction of the scale desired.

A still further object of the invention is the provision of an attachment for photographic cameras which is relatively simple in construction, accurate and dependable in operation, and which can be manufactured and installed at relatively low cost.

With the above objects in view, as well as others that will present themselves in the course of the following disclosure, reference will be made to the accompanying drawings, forming part of same, and wherein—

Fig. 1 is a side elevation of the attachment in operative association with a photographic camera.

Fig. 2 is a right hand end elevation of the construction disclosed in Fig. 1.

Fig. 3 is a left hand end elevation of the construction disclosed in Fig. 1.

Fig. 4 is an enlarged horizontal section substantially in a plane represented by line 4—4 in Fig. 1 and disclosing only the variable drive means between the copy strip and sensitized camera strip.

Fig. 5 is an end elevation of the roller belt tensioning and shifting means.

Referring to the drawings by reference characters, and wherein like characters designate like parts, C designates a photographic camera of any well known construction for the reproduction of characters, records, etc. The camera C is in accordance with well known practice adjustably supported on a frame F.

Supported by the frame F is a table T which is vertically adjustable by means of threaded rod r, bevel gears g and handle h, the vertical adjustment being relative to the lens L and prism P of the camera C for determining the relative sizes of the reproduction and the original copy. The vertical adjustment of the table T is determined by the scale S.

The camera C further includes the sensitized paper, roll magazine M, the paper winding roll R and the paper severing knife K.

The attachment forming the subject matter of the present invention embodies a copy strip propelling means 10, supported by the table T vertically below the prism P and a variable drive 11 between the propelling means 10 and the paper winding roll R, whereby the speed of movement of the strip may be varied in accordance with the focal adjustment of the camera as determined by the scale S.

The copy strip propelling means 10 comprises a pair of horizontally spaced rollers 12 and 13 suitably journalled in side plates 14 carried by the table T. A strip conveyor belt 15 passes around the rollers 12 and 13 and the paper strip is maintained in firm driving engagement with the belt 15 by means of horizontally spaced idler rollers 16 suitably supported by side plates 14.

Disposed between the idler rollers 16 is a glass 17 beneath which the copy strip moves.

The drive 11 comprises a pair of horizontally arranged frusto-conical rollers 18 and 19, the opposite ends of which are suitably journalled in the frame F closely adjacent the top thereof, as is clearly illustrated in the drawings.

The rollers 18 and 19, while not necessarily so, are each preferably of such conicity that one end has a diameter double that of the opposite end and the rollers are disposed with their larger ends adjacent opposite ends of the frame, whereby the space between the rollers is of uniform width from end to end and the lines defining the opposite edges of the rollers are parallel.

The roller 18 is constantly driven at uniform speed by means of a motor 20 provided with suitable reduction gearing, the motor imparting rotation to pulley 21 through belt 22 and the pulley 21 in turn imparting rotation to roller 18 through the sprocket chain 23 and cooperating sprockets 24 and 25 respectively.

Secured to the spindle 18' of roller 18 is a gear 26 which meshes with and drives a similar gear 27 fixed on a shaft 28 extending parallel with and slightly above the axis of roller 18. Fixed to shaft 28 intermediate the ends thereof is a worm gear 29 in mesh with a gear 30 on the lower end of a vertical shaft 31 whose opposite ends are suitably journalled in sprockets 32 and 33.

Fixed to the upper end of shaft 31 is a gear 34 in driving engagement with a worm gear 35 secured to the shaft of the paper winding roll R.

The relative sizes of pulley and sprockets between the motor 20 and roller spindle 18' is such that the roller 18 will rotate at a speed much reduced to that of the motor shaft, the gearing between the roller 18 and winding roll R, however, being such that the roller 18 and roll R will rotate at the same speed.

Fixed to the spindle 19' of the roller 19 is a worm gear 36 in driving engagement with a gear 37 fixed to the vertical shaft 38 adjacent the upper end thereof.

The lower end of shaft 38 has an axial free bearing in table T and has fixed thereto adjacent table T a gear 39 in driving engagement with a worm gear 40 supported by one end of a horizontal shaft 41 to whose opposite end is fixed a gear 42, the gear 42 meshing with an idler gear 43 which in turn drives a gear 44 fixed to the spindle of roller 13.

The gearing interposed between roller 19 and the paper strip propelling means 10 as above described is such that roller 19 and rollers 12 and 13 rotate at the same speed.

From the foregoing it will be seen that the paper winding roll R is driven by roller 18 at uniform speed therewith and that the paper strip propelling means is operated by roller 19 at uniform speed therewith.

The roller 18 being positively driven by motor 20, means in accordance with the present invention are provided to impart variable rotation to the roller 19 from the roller 18.

Such means in a preferred embodiment thereof comprises a belt 45 operatively engaged with rollers 18 and 19 and due to the reversed arrangement of the rollers the belt is capable of engaging the rollers throughout the longitudinal extent thereof under the same tension.

The belt 45 intermediate the rollers 18 and 19 extends through a belt shifting member 46.

The member 46 comprises a U-shaped element 47, the legs of which extend on opposite sides of the belt, and rotatably journalled in the upper ends of the legs is a belt tensioning pulley 48 whereby the belt will be maintained in taut driving engagement with the rollers, as will clearly be seen upon inspection of Fig. 3.

The U-shaped element 47 at the base thereof is suitably secured to the rear end of a bar 49. The bar 49 adjacent the front end thereof is angled upwardly as indicated at 50 and a block 51 is carried by the end of the angled portion.

The block 51 is centrally apertured transverse to bar 49 for receiving a rod 52 and for free movement therealong. The rod 52 is secured at opposite ends thereof in suitable brackets 53 fixed to frame F.

Carried by block 51 at right angles to and intersecting the aperture therein is a set screw 54 for locking the bar in any adjusted position longitudinally of the frame. Carried by the frame F adjacent the top thereof is a scale bar 55 and supported detachably or otherwise by the block 51 is a pointer 56 movable along the scale bar concurrent with movement of the belt shifting member 46.

It will of course be understood that the scales S and 55 are properly coordinated whereby the belt 45 will be positioned in conformity with the focal adjustment of table T.

In operation of the construction described, the copy strip to be reproduced is placed upon the conveyor belt 15, the table T is vertically adjusted by means of handle h and rod r relative to the camera lens L for any desired size reproduction of the original, the same reduced or enlarged as is determined by the scale S.

When the reproduction is to be of the same size as the original, the sensitized paper strip in the camera C and the copy strip supported on the belt 15 should travel at the same rates of speed, and for such equal rates of speed the belt 45 will be positioned in the center of the rollers 18 and 19 as is illustrated in Fig. 4, as at this point the rollers are of equal diameter whereby roller 19 will rotate at the same speed as the driven roller 18.

When a reduced reproduction is desired the copy strip should travel faster than the sensitized camera strip, and accordingly after proper vertical adjustment of the table T, the belt 45 is shifted to the right to a position as indicated by scale 55 for the particular reduction as indicated by the scale S.

If the belt 45 be placed at the extreme right ends of rollers 18 and 19 the copy strip will travel twice as fast as the sensitized camera strip and a reproduction of one half the size of the original will result if the table T has been adjusted for such reduction.

If the belt 45 be shifted to the left on rollers 18 and 19 the copy strip will travel slower than the sensitized camera strip for an enlarged reproduction of such size dependent upon the adjustment of table T and the extent of movement of the belt 45 toward the left hand ends of the rollers 18 and 19.

When the enlargement is to be twice the original size, the belt 45 will be positioned at the extreme left ends of the rollers 18 and 19.

Thus it will be apparent that a photograph attachment is provided whereby lengthy copies may be continuously reproduced on single lengths of photographic papers and that the sizes of the reproductions relative to the originals may readily be varied by adjustment of table T and belt 45.

While the rollers 18 and 19 are herein disclosed of such conicity that the copy may be enlarged to double size or reduced to one-half size, the conicity may be such as to provide for a greater range in sizes of reproduction.

Due to the reversed arrangement of the rollers 18 and 19 the tension on the belt 45 by means of pulley 48 will be uniform regardless of its position lengthwise of the rollers and the belt is free to be shifted by bar 49 longitudinally of the rollers.

While the attachment above described is similar in construction and operation to that disclosed in my aforementioned pending application, it is to be particularly noted that the belt drive of the pending application is herein replaced by a gear drive.

While the construction utilizing the belt drive attained its objects with substantial success it was found that, due to the relatively long belts utilized and particularly the belt extending from the rollers adjacent the bottom of the frame to the camera paper winding roll some slack developed in the course of operation with a consequent ineffectiveness of drive which may effect the scale of enlargement or reduction of the copy.

With the present construction wherein the transmission rollers 18 and 19 are disposed adjacent the top of the frame and the drive connections between the rollers and the paper winding roll and copy strip propelling means consist in shafts in meshing gears, the drive will always be positive and accurate with the assurance of a reproduction of the exact scale as indicated by the scales S and SS associated with the table T and belt shifting bar 49, respectively.

While I have disclosed but a single specific embodiment of my invention, same is to be considered as illustrative only, and not restrictive, the scope of the invention being defined in the subjoined claims.

What is claimed is:—

1. In combination with a photographic device including a frame, a camera having a sensitized paper winding roll adjustably supported on the top of the frame, and a vertically adjustable table supported by one end of the frame, an attachment comprising a copy strip conveyor mounted on the table, a pair of parallel and horizontally disposed frusto-conical rollers journaled in the frame adjacent the top thereof, the rollers being oppositely lengthwise disposed, one of the rollers being continuously driven, a drive connection between the driven roller and the other roller, gear and shaft drive connections between the driven roller and the paper winding roll, and gear and shaft drive connections between the other roller and the copy strip conveyor, said first gear and shaft drive connections comprising a shaft parallel with and adjacent the driven rollers, a vertically disposed shaft intermediate the ends of the first shaft, and meshing gears interconnecting the driven roller, parallel and vertical shafts and the paper winding roll.

2. In combination with a photographic device including a frame, a camera having a sensitized paper winding roll adjustably supported on the top of the frame, and a vertically adjustable table supported by one end of the frame, an attachment comprising a copy strip conveyor mounted on the table, a pair of parallel and horizontally disposed frusto-conical rollers journaled in the frame adjacent the top thereof, the rollers being oppositely lengthwise disposed, one of the rollers being continuously driven, a drive connection between the driven roller and the other roller, gear and shaft drive connections between the driven roller and the paper winding roll, and gear and shaft drive connections between the other roller and the copy strip conveyor, said drive connections between the rollers comprising a belt, the belt being confined within a belt shifting member, the belt shifting member being guided longitudinally of the rollers by means of a rod, parallel with the rollers, and a belt tensioning pulley journaled in the belt shifting member.

3. In combination with a photographic device including a frame, a camera having a sensitized paper winding roll adjustably supported on the top of the frame and a vertically adjustable table supported by one end of the frame, an attachment comprising a copy strip conveyor mounted on the table, a vertically disposed shaft, driving connections between the shaft and the paper winding roll, a second vertically disposed shaft, driving connections between the second shaft and the copy strip conveyor, drive means operatively connected with the first shaft for rotating the paper winding roll, and means operatively connected with the second shaft and having a variable drive connection with said drive means for moving the copy strip conveyor at variable speeds with relation to the speed of rotation of the paper winding roll.

JOHN J. JOHNSON.